US007045229B2

(12) United States Patent
Kobayashi et al.

(10) Patent No.: US 7,045,229 B2
(45) Date of Patent: *May 16, 2006

(54) GAS-SUPPLYING APPARATUS, GAS-SUPPLYING MECHANISM AND GAS-SUPPLYING PROCESS IN FUEL CELL

(75) Inventors: Tomoki Kobayashi, Saitama (JP); Takuma Kanazawa, Saitama (JP); Yoshio Nuiya, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/870,524

(22) Filed: May 30, 2001

(65) Prior Publication Data

US 2002/0006537 A1    Jan. 17, 2002

(30) Foreign Application Priority Data

May 30, 2000    (JP)    .............................. 2000-160097

(51) Int. Cl.
*H01M 8/04*    (2006.01)
(52) U.S. Cl. ............................. 429/13; 429/24; 429/25; 429/26
(58) Field of Classification Search .................. 429/13, 429/22, 24, 25, 26
See application file for complete search history.

(56) References Cited

U.S. PATENT DOCUMENTS

| 5,208,114 | A | 5/1993 | Uematsu et al. .............. 429/20 |
| 5,441,819 | A | 8/1995 | Voss et al. .................... 429/13 |
| 5,518,828 | A | 5/1996 | Senetar ........................ 429/26 |
| 5,543,238 | A | 8/1996 | Strasser ....................... 429/17 |
| 5,928,805 | A | 7/1999 | Singh et al. .................. 429/13 |
| 6,106,964 | A | 8/2000 | Voss et al. .................... 429/20 |
| 6,268,074 | B1 | 7/2001 | Siepierski et al. ............ 429/13 |
| 6,306,532 | B1 | 10/2001 | Kurita et al. ................. 429/20 |
| 6,331,366 | B1 * | 12/2001 | Van Dine et al. ............. 429/17 |
| 6,394,207 | B1 | 5/2002 | Skala ........................ 180/65.2 |
| 6,447,939 | B1 | 9/2002 | Iwasaki ........................ 429/9 |
| 6,497,971 | B1 * | 12/2002 | Reiser ......................... 429/13 |
| 6,696,192 | B1 * | 2/2004 | Kanai et al. .................. 429/34 |
| 2001/0021468 | A1 * | 9/2001 | Kanai et al. .................. 429/12 |
| 2002/0034669 | A1 * | 3/2002 | Kobayashi et al. ........... 429/25 |

OTHER PUBLICATIONS

Geankoplis, C. J., Transport Processes and Unit Operations, 3$^{rd}$ Edition, Prentice-Hall Inc., 1993, pp. 133-139.*

* cited by examiner

*Primary Examiner*—Jonathan Crepeau
(74) *Attorney, Agent, or Firm*—Lahive & Cockfield, LLP; Anthony A. Laurentano, Esq.

(57) ABSTRACT

A gas-supplying apparatus in a fuel cell comprises a compressor which sucks a supply gas to be supplied to a fuel cell from downstream of said fuel cell, and which compresses an exhaust gas, generated from said supply gas by power generation in the fuel cell, exhausted from the fuel cell, and a heat exchanger which performs heat exchange between said supply gas and said exhaust gas. The apparatus has a simple configuration and improved heat efficiency.

13 Claims, 7 Drawing Sheets

GAS-SUPPLYING APPARATUS, GAS-SUPPLYING MECHANISM AND GAS-SUPPLYING PROCESS IN FUEL CELL

RELATED APPLICATIONS

This application claims priority to Japanese Patent Application No. 2000-160097 filed on May 30, 2000 in Japan. The contents of the aforementioned application are hereby incorporated by reference.

BACKGROUND OF THE INVENTION

1. Field of the Invention

The present invention relates to a gas-supplying apparatus, gas-supplying mechanism, and a gas supplying process in fuel cell, which can make use of heat in an effective manner by carrying out heat-exchange between a supply gas supplied into a fuel cell and an exhaust gas exhausted from the fuel cell.

2. Description of Related Arts

A fuel cell (solid macromolecular type fuel cell) has recently drawn considerable attention as a power source of an electric vehicle etc., because of its cleanness and excellent energy efficiency. Since the fuel cell works at a temperature above the room temperature, a supply gas to be supplied to the fuel cell is heated and the heat from an exhaust gas exhausted from the fuel cell is recovered. For example, Japanese Patent Laid-Open No. 7-176313 discloses a fuel cell system having a regenerative heat-exchanging apparatus, which carries out heat exchange between air supplied to the fuel cell (supply air) and exhaust air from the fuel cell, and which humidifies the supply air. According to the publication, the heat generated from the fuel cell can be effectively used.

However, in order to improve the efficiency of the fuel cell, much more effective utilization of the heat from the fuel cell has been desired. Also, it has been desired for effectively operating the fuel cell to vary, and preferably control, the temperature of the supply gas to be supplied to the fuel cell. In this case, it is preferred if the effective utilization of the heat and the temperature control of the supply gas can be realized with a simple configuration.

In addition, in a fuel cell system having a configuration that the supply gas is compressed through a compressor, and the compressed gas is supplied to the fuel cell, the supply gas is compressed only in a low amount through the compressor when the load of the fuel cell is small and; therefore, the temperature of the supply gas is small. Accordingly, the heat exchanger should heat the supply gas in this case. On the other hand, since the supply gas is heavily compressed when the fuel cell is heavily loaded, the temperature of the supply gas becomes large. In some cases, the temperature of the supply gas becomes higher than the operation temperature of the fuel cell (greater than 120° C.). Consequently, the heat exchanger should heat or cool down the supply gas, resulting in a complication of the apparatus. For this reason, it has been desired to develop a gas-supplying apparatus, which can control the temperature of the gas supplied to the fuel cell with a simple configuration.

SUMMARY OF THE INVENTION

A main object of the present invention is, therefore, to provide a gas-supplying apparatus, a gas-supplying mechanism and a gas-supplying process in a fuel cell, which can solve the problem associated with the prior art.

We have conducted serious studies in light of the above object, we have accomplished the present invention considering the heat generation during the course of the compression through the compressor and the layout of various related devices.

Specifically, a gas-supplying apparatus in a fuel cell according to the present invention comprises a compressor which sucks a supply gas to be supplied to a fuel cell from downstream of said fuel cell, and which compresses an exhaust gas, generated from said supply gas by power generation in the fuel cell, exhausted from the fuel cell, and a heat exchanger which performs heat exchange between said supply gas and said exhaust gas.

According to such a configuration, the compressor sucks the gas upstream the compressor (i.e., the supply gas and the exhaust gas from the fuel cell before entering the compressor). On the other hand, the exhaust gas at the discharge side of the compressor is compressed to a pressure (discharge pressure) higher than that at the side of the suction. The exhaust gas whose temperature is increased during the compression is supplied to the heat exchanger, at which the heat exchange between the exhaust gas and the supply gas is performed to heat the supply gas. At this time, the heat exchanger transmits the heat of the exhaust gas to the supply gas.

The gas-supplying apparatus in a fuel cell according to the present invention preferably possesses a controller, which controls the pressure of the exhaust gas to be incorporated into the heat exchanger with the use of a control valve being particularly preferable.

According to this configuration, when the pressure of the gas downstream of the compressor (discharge pressure) is increased by the control valve, the temperature of the exhaust gas can be increased accordingly. Conversely, if the discharge pressure is decreased by the control valve, the degree of increasing the temperature can be decreased. Specifically, the range of increasing the temperature of the gas at the side downstream of the compressor can be varied. The exhaust gas in which the range of increasing the temperature is variable is heat-exchanged with the supply gas through the heat exchanger to heat the supply gas. In the case where the controller is composed of a pressure control valve such as a butterfly valve, the pressure at the downstream of side can be adjusted to be decreased if the opening degree of the valve is decreased, while such a pressure can be adjusted to be large if the opening degree of the valve is increased.

In this embodiment, the controller is preferably controlled depending upon the temperature of the supply gas.

According to this preferred configuration, the temperature of the supply gas to be supplied to the fuel cell can be adjusted to be optimal.

In this preferred embodiment, the controller is preferably controlled in such a manner that the temperature of the supply gas becomes a demand temperature. More preferably, the pressure of the exhaust gas to be introduced into the heat exchanger is controlled through the controller so as to be increased when the temperature of the supply gas is lower than the demand temperature.

Specifically, the temperature of the exhaust gas is increased if the pressure of the gas at the downstream of side of the compressor is increased, whereupon the capacity of the heat exchange through the heat exchanger is increased to increase the temperature of the supply gas. Conversely, the temperature of the exhaust gas is decreased if the pressure of the gas at the downstream of side of the compressor is decreased, whereupon the capacity of the heat exchange through the heat exchanger is decreased to decrease the temperature of the supply gas. Consequently, according to this configuration, if the temperature of the supply gas is lower than the demand temperature, the temperature thereof can be increased. On the other hand, if the temperature of the supply gas is higher than the demand temperature, it can be decreased. Specifically, in the gas-supplying apparatus according to this embodiment, the temperature of the supply gas can be controlled within the range between a prescribed upper temperature and a prescribed lower temperature. The prescribed upper and lower temperatures can be freely set depending upon the types of the fuel cell and the operation conditions.

In another preferred embodiment of the gas-supplying apparatus in the fuel cell according to the present invention, the heat exchanger may comprise a water-permeable membrane type humidifier which humidifies the supply gas with the water contained in the exhaust gas.

The water-permeable membrane type humidifier plays a role in a heat exchanger which performs heat exchange between the supply gas and the exhaust gas, and the gas-supplying apparatus in this embodiment has no heat exchanger as a device. Consequently, the configuration can be simplified. The term "heat exchanger" to be used herein is intended to encompass any heat exchanging means as long as it can perform heat exchange between the supply gas and the exhaust gas, provided that the supply gas and the exhaust gas are not mixed as in the case of "direct contact heat exchanger".

In the embodiment where the water-permeable membrane type humidifier is used, the humidity of the supply gas can be controlled instead of the temperature of the supply gas in the above-mentioned preferred embodiment.

In the broadest aspect of the present invention, there is provided a gas-supplying apparatus in a fuel cell having a heat exchanger which performs heat exchange between a supply gas and an exhaust gas, generated from said supply gas by power generation in the fuel cell, exhausted from the fuel cell, to transmit the heat from said exhaust gas to the supply gas, said gas-supplying apparatus further possessing a temperature controller which controls the temperature of the exhaust gas to be introduced into said heat exchanger.

The present invention further concerns a process for controlling a temperature of a supply gas in a supply gas to be supplied to a fuel cell which comprises: introducing said supply gas into a heat exchanger and, at the same time, introducing an exhaust gas discharged from the fuel cell into said heat exchanger to perform heat exchange between the supply gas and the exhaust gas.

In the process for controlling a temperature of a supply gas to be supplied to a fuel cell according to the present invention, the temperature of said exhaust gas is preferably controlled before it is introduced into said heat exchanger. More preferably, the temperature of said exhaust gas is controlled by compressing said exhaust gas. Still more preferably, the temperature of said exhaust gas is controlled by adjusting the flow amount of the exhaust gas to be introduced into said heat exchanger.

Furthermore, it is preferable for easily controlling the temperature of the supply gas and for enhancing the accuracy to adjust the flow amount of the exhaust gas to be introduced into the heat exchanger. The temperature of the exhaust gas and the flow amount of the exhaust gas are parameters having a great influence upon the heat-exchanging amount in the heat exchanger. Under the same temperature of the exhaust gas, as the flow amount of the exhaust gas is increased, the heat-exchanging amount becomes greater. Conversely, as the flow amount of the exhaust gas is decreased, the heat-exchanging amount becomes smaller.

DESCRIPTION OF THE PREFERRED EMBODIMENTS

Embodiments of the gas-supplying apparatus in the fuel cell according to the present invention will now be described by referring to the attached drawings.

First Embodiment

The gas-supplying apparatus in the fuel cell according to the first embodiment will be described herein below.

Figure 1:
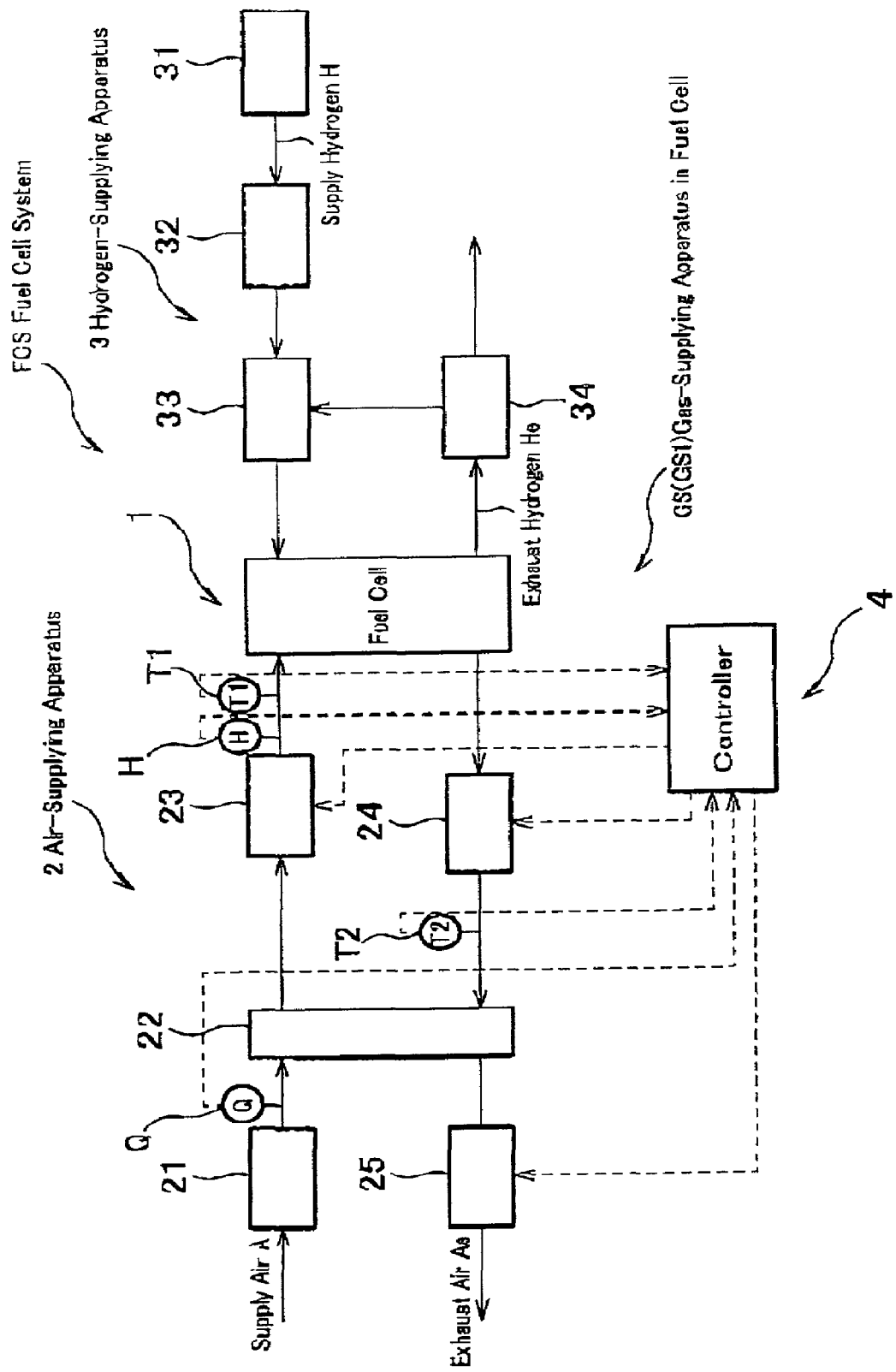
FIG. 1 totally shows a fuel cell system including a gas-supplying apparatus in the fuel cell according to the present invention.
Figure 2:
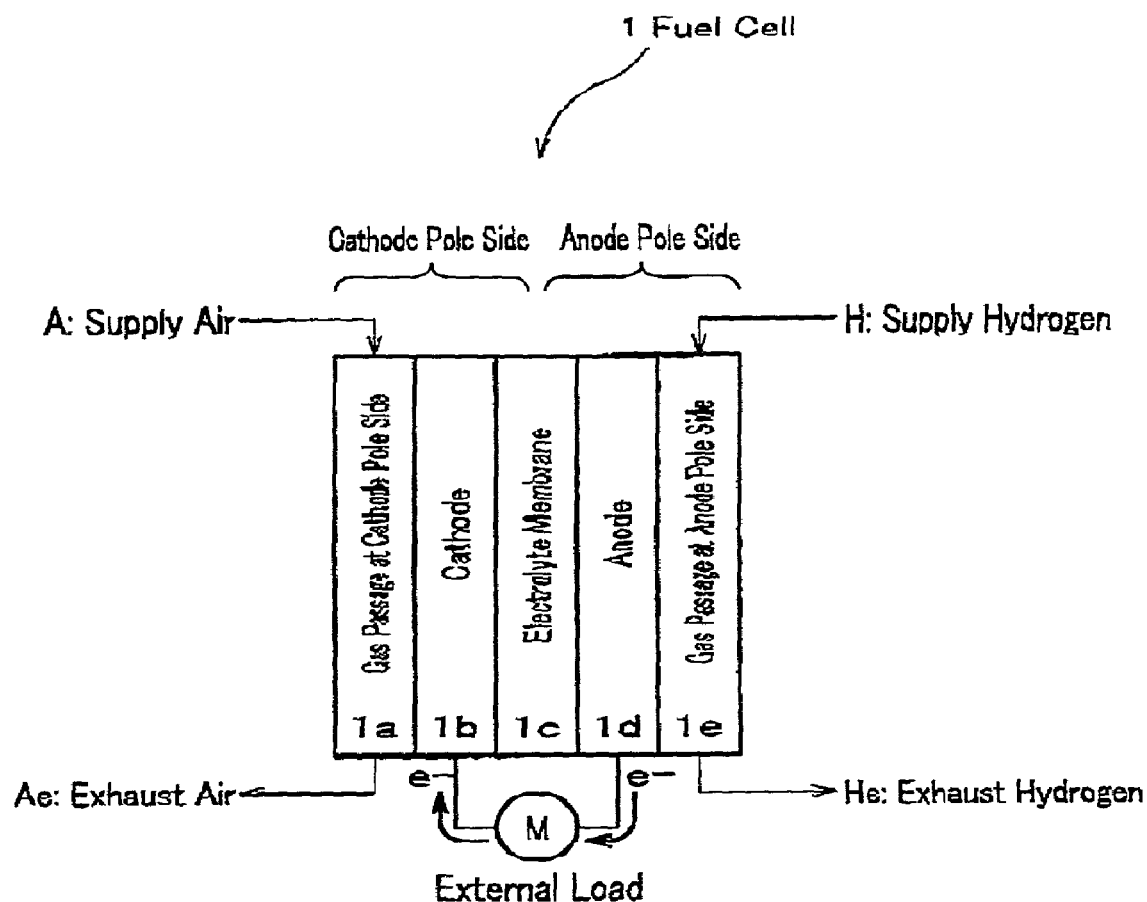
FIG. 2 is a schematic view illustrating the configuration of the fuel cell in FIG. 1.
Figure 3:
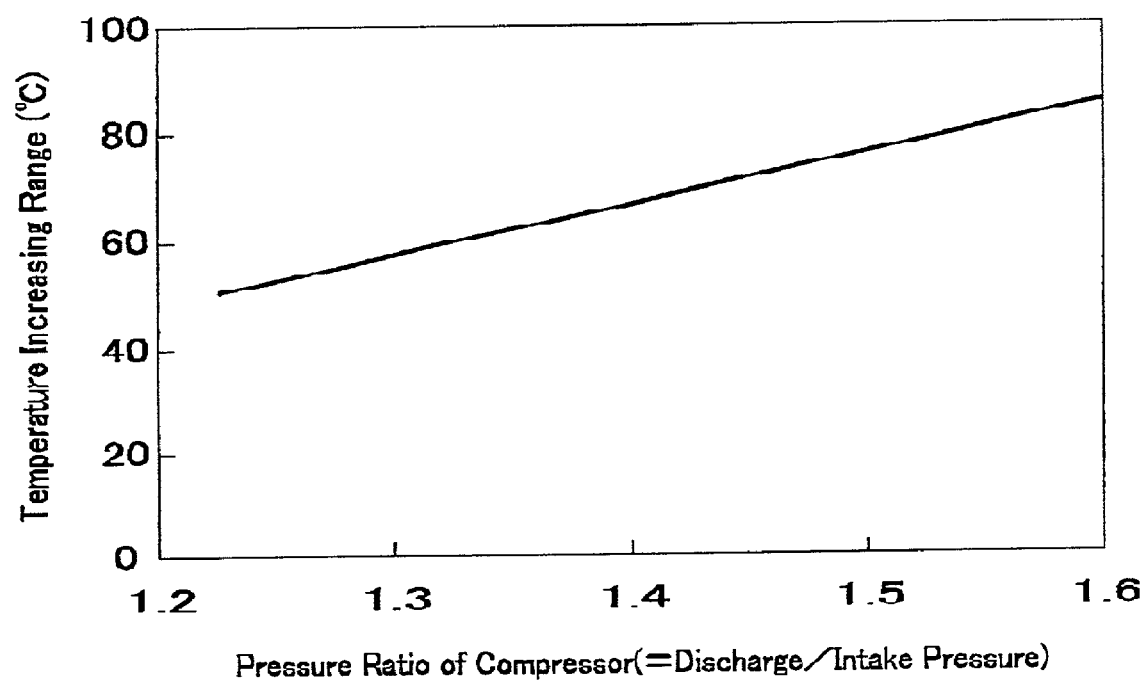
FIG. 3 is a graph showing the temperature-increasing profile in the compressor shown in FIG. 1.

In the following explanation which demonstrates the first embodiment, FIGS. 1 to 3 are used for the reference, wherein FIG. 1 totally shows a fuel cell system including a gas-supplying apparatus in the fuel cell according to the present invention; FIG. 2 is a schematic view illustrating the configuration of the fuel cell in FIG. 1; and FIG. 3 is a graph showing the temperature-increasing profile in the compressor shown in FIG. 1.

A fuel cell system FCS shown in FIG. 1 is an electric power generation system based on a fuel cell 1. The fuel cell system FCS is mainly composed of the fuel cell 1, an air-supplying apparatus 2, a hydrogen-supplying apparatus 3, and the like. The gas-supplying apparatus GS (GS1) is composed of the air-supplying apparatus 2, the hydrogen supplying apparatus 3, and a control unit 4.

As shown in FIG. 2, the fuel cell 1 is divided into a cathode side (an oxygen pole side) and an anode side (a hydrogen pole side) across an electrolyte membrane $1c$. Electrodes containing a platinum series catalyst are provided on both sides to form a cathode electrode $1b$ and an anode electrode $1d$, respectively. As the electrolyte membrane $1c$, a solid macromolecular membrane such as a perfluorocarbon sulfonic acid membrane, which is a proton-exchange membrane, is used. The electrolyte membrane $1c$ has a plurality of proton exchanging groups in the molecule thereof, and a low specific resistance not more than 20 $\Omega$-proton at the normal temperature when it has a saturated moisture content, acting as a proton-conductive electrolyte. The catalyst contained in the cathode $1b$ is a catalyst in order to produce oxygen ions from oxygen, and the catalyst contained in the anode 1d is a catalyst in order to produce protons from hydrogen.

A cathode side gas passage 1a which allows a supply gas A as an oxidant gas for passing therethrough is provided outside the cathode electrode 1b, while an anode side gas passage 1e which allows hydrogen H to be supplied as a fuel gas for passing therethrough is provided outside the anode electrode 1d. An inlet and outlet of the cathode side gas passage 1a are connected to the air-supplying apparatus 2, and an inlet and outlet of the anode side gas passage 1d are connected to the hydrogen-supplying apparatus 3. The configuration of the fuel cell 1 shown in FIG. 2 is schematically shown as a single cell, but an actual fuel cell 1 is made up of a laminate with approximately 200 single cells laminated. Since the fuel cell heats up due to electrochemical reaction during the course of the power generation, the fuel cell 1 has a cooler (not shown) which cools the fuel cell 1.

In the fuel cell 1, when the supply air A is supplied to the cathode side gas passage 1a and the supply hydrogen H is supplied to the anode side gas passage 1e, hydrogen is ionized due to the catalyzation at the anode electrode 1d to produce protons, which then move within the electrolyte membrane 1c to reach the cathode electrode 1b. The protons reaching the cathode electrode 1b are readily reacted with the oxygen ions produced from the oxygen contained in the supply air A to produce water. The supply air A containing the water thus produced is discharged from the outlet at the cathode side of the fuel cell 1 as exhaust air Ae, which contains a large amount of moisture). Electron $e^-$ are produced at the anode electrode 1d at the time of ionizing hydrogen, the resulting electrons e– reach the cathode electrode 1b via an external load M such as a motor.

As shown in FIG. 1, the air-supplying apparatus 2 making up the gas-supplying apparatus GS1 in the fuel cell is composed mainly of an air cleaner 21, a heat exchanger 22, a humidifier 23, a compressor 24, a pressure control sensor 25, an airometer (flow sensor) Q, thermo-sensors $T_1$ and $T_2$, a humidity sensor H, and the like.

The air cleaner 21 is composed of a filer (not shown), and the like, and filtrates the air supplied to cathode electrode side of the fuel cell 1 (supply air A) the to thereby remove dusts contained in the supply air A.

The heat exchanger 22 (as an apparatus) is composed of a plate type heat exchanger or a shell and tube type heat exchanger possessing passages at a low temperature fluid side and a high temperature side (not shown), and performs heat exchange between the air compressed through the compressor 24 (exhaust air Ae) and the supply air A having been filtered through the air cleaner 21. The supply air A is heated through the heat exchanger 22 and then is introduced into the fuel cell 1. The fuel cell 1 is operated at a temperature from about 80 to 90° C. For this reason, the temperature-controlled supply air A controlled to be from 60 to 75° C. is introduced into the fuel cell 1. The temperature control of the supply air A will be described fully later on.

The humidifier 23, which is one of a carburetor, is composed of Venturi tubes (capillary tubes), a water-storage tank, a siphon which connects the Venturi tubes and the water-storage tank etc. (not shown), the water stored in the water-storage tank is pumped by the Venturi action and is sprayed to humidify the supply air A. Into the siphon tube is inserted a needle which is driven by a stepping motor to control the flow amount of the water flowing through the siphon tube (the needle and the siphon tube making up a needle valve). As described above, the humidification of the supply air A is to humidify the fuel cell 1 thereby preventing the drying of the electrolyte membrane 1c shown in FIG. 2. If the electrolyte membrane 1c is dried, the migration of the protons is inhibited, lowering the electromotive force. On the other hand, if the fuel cell 1 is humidified in excess, the cathode side gas passage 1a shown in FIG. 1 and/or diffusion layers (not shown) are soaked in water, leading to decrease in the electromotive power. The humidifier 23 may be comprised of a water-permeable membrane.

The compressor 24 (means for pressing in the exhaust gas) is composed of a super charger (volume type compressor), a motor which drives the super charger (not shown), and the like, and the compressor 24 sucks the supply air A which has been used as the oxidant gas in the fuel cell 1, i.e., the exhaust air Ae discharged from the cathode pole side of the fuel cell 1, and deliveries it to the later heat exchanger 22. By sucking the supply air A, the compressor 24 plays role in operating the fuel cell 1 through a negative pressure (pressure not higher than the atmospheric pressure). The compressor also adiabatically compresses the exhaust air Ae to raise the temperature of the exhaust air, whereby the exhaust air Ae having been heated up is used as a heat source for heating the supply air A.

The pressure control valve (pressure controller) 25 is composed of a butterfly valve and a stepping motor (not shown), and the like, and it controls the pressure of the exhaust air Ae out of the compressor (discharge pressure) by decreasing or increasing the opening of the pressure control valve 25. When the opening of the pressure control valve 25 is decreased, the discharge pressure from the compressor 24 is increased and, accordingly, the range of increasing the temperature of the exhaust air Ae is increased. Conversely, when the opening of the pressure control valve 25 is increased, the discharge pressure from the compressor 24 is decreased, and accordingly, the range of increasing the temperature of the exhaust air Ae is decreased.

The airometer Q is composed of a differential pressure type flow meter etc., and it detects the flow amount of the supply air A after flowing through the air cleaner 21 and sends the detected signal to the controller 4.

The thermo-sensor $T_1$ is composed of a thermister etc., and it detects the temperature of the supply gas A at the inlet of the fuel cell 1 at the cathode side, which is sent to the controller 4.

The thermo-sensor $T_2$ is composed of a thermister etc., similar to the thermo-sensor $T_1$, and it detects the temperature of the exhaust air Ae at the outlet of the compressor 24, which is sent to the controller 4.

The humidity sensor H is composed of a macromolecular type humidification sensor, etc., and it detects the humidity of the supply gas A at the inlet of the fuel cell 1 at the cathode side, which is sent to the controller 4.

As shown in FIG. 1, the hydrogen-supplying apparatus 3 is composed of a hydrogen gas cylinder 31, a regulator 32, a hydrogen-circulating pump, a three-way valve 34, and the like.

The hydrogen gas cylinder 31 is composed of a high-pressure hydrogen bottle (not shown) and it stores the supply hydrogen gas H to be introduced into the anode pole side of the fuel cell 1. The supply hydrogen H to be stored is pure hydrogen having a pressure of from 15 to 20 MpaG (150–200 kg/cm$^2$G). It is noted that the hydrogen gas cylinder 31 may be a type having a built-in hydrogen-occlusion alloy which stores hydrogen at a pressure of approximately 1 MpaG (10 kg/cm$^2$G).

The regulator 32 is composed of a diaphragm, a pressure-adjusting spring (not shown), etc. and is a pressure controller which decreases the pressure of the supply hydrogen stored at a high pressure to a prescribed level so that the supply hydrogen H may be utilized at a constant pressure. Taking the atmospheric pressure as the reference pressure to be introduced into the diaphragm, the regulator 32 can decrease the pressure of the supply hydrogen H stored in the hydrogen gas cylinder 31 to a level near the atmospheric pressure. Taking the pressure of the negative pressure portion of the air-supplying apparatus 2 which is operated at a negative pressure as a reference pressure to be introduced into the diaphragm, the pressure of the supply hydrogen H stored in the hydrogen gas cylinder 31 can be decreased to a pressure near the pressure of the corresponding negative pressure portion. In the first embodiment, since the hydrogen-supplying apparatus 3 is operated at a negative pressure not higher than the atmospheric pressure, the pressure at the intake side of the compressor 2 of the air-supplying apparatus 2 is input as the reference pressure. By operating the hydrogen-supplying apparatus 3 at a negative pressure, the external leakage of the flowing hydrogen can be prevented, which improve the fuel efficiency.

The hydrogen-circulating pump 33 is composed of an ejector (not shown), etc., and it utilize a flow of the supply hydrogen H towards the anode side of the fuel cell 1 to suck the supply hydrogen H having been used in the fuel cell 1, i.e., the exhaust hydrogen He, which is discharged from the anode side of the fuel cell 1 and flows through a three-way valve 34, and to circulate it. The reason why the exhaust hydrogen is circulated and used is that the supply hydrogen H is pure hydrogen stored in the hydrogen gas cylinder 31.

The three-way valve 34 is composed of a passage switcher (not shown), etc., and it switches the passage of the exhaust hydrogen He to the discharge position or circulation position. When the three-way valve 34 is switched to the discharge position, the exhaust hydrogen He is discharged out of the system of the hydrogen-supplying apparatus 3. When the three-way valve 34 is switched to the circulation position, the exhaust hydrogen He is introduced into a hydrogen circulation pump 33.

The controller 4 which makes up the gas-supplying apparatus GS1 in the fuel cell is composed of CPU, memories, I/O interface, A/D converter, bus, etc., (not shown). The controller 4 totally controls the fuel cell system FCS. The controller 4 also controls the flow amount, temperature and the humidity of the supply air A to be supplied to the fuel cell 1. The controller 4 receives the detected signals from sensors Q, $T_1$, and $T_2$. Also, the controller 4 sends the control signals to the humidifier, to the compressor 24 and to the pressure control valve. The control of the flow amount, temperature and the humidity of the supply air A will now be described.

(1) With regard to the control of the flow amount, the controller 4 sets a target flow amount of the supply air A to be required through a map etc., on the basis of the output demand signal from means for adjusting output such as an accelerator pedal (not shown). When the target flow amount is increased, the controller 4 produces a control signal so as to increase the discharge amount from the compressor 24 (revolution number of the motor) and send it to the compressor 24. On the other hand, when the target flow amount is decreased, the controller 4 produces a control signal so as to decrease the discharge amount from the compressor 24 (revolution number of the motor) and send it to the compressor 24. At this time, a feed back control is performed so that the deviation between the detected signal from the airometer Q and the target flow amount becomes zero.

(2) With regard to the temperature control, the controller 4 the temperature of the supply air A to be the target temperature ranging from 60° C. (the lower limit of the prescribed temperature) to 75° C. (the upper limit of the prescribed temperature) on the basis of the detected signal from the thermo-sensor $T_1$ by means of the opening of the pressure control valve 25 through the stepping motor. Specifically, when the temperature of the supply air A is or will be increased to be not lower than the target temperature, the controller 4 produces a control signal so as to drive the stepping motor in such a manner as to decrease the opening of the pressure control valve, and send the produced signal. This decreases the discharge amount from the compressor 24, decreasing the temperature of the exhaust gas Ae, which in turn, decreases the heat exchange amount in the heat exchanger 22 to thereby decrease the temperature of the supply air A. On the other hand, when the temperature of the supply air A is or will be decreased to be not higher than the target temperature, the controller 4 produces a control signal so as to drive the stepping motor in such a manner as to increase the opening of the pressure control valve, and send the produced signal. This increases the discharge amount from the compressor 24, increasing the temperature of the exhaust gas Ae, which in turn, increases the heat exchange amount in the heat exchanger 22 to thereby increase the temperature of the supply air A. At this time, a feed back control is performed so that the deviation between the detected signal from the thermo-meter $T_1$ and the target temperature becomes zero. Irrelevant to the opening of the pressure control valve 25, the compressor 24 actuates to supply the supply air A in a target flow amount into the fuel cell 1.

As a fail-safe mechanism, when the detected signal from the thermo-sensor $T_2$ becomes higher than a given level (not lower than 150° C.), in order to protect the compressor 24, etc., the controller 4 produces a control signal for increasing the opening of the pressure control valve 25 and/or a control signal for decreasing the discharge amount from the compressor 24 and send it/them. This decreases the temperature at the discharge side of the compressor 24 to thereby protect the compressor 24.

FIG. 3 shows a relationship between the pressure ratio (discharge pressure/intake pressure) of the compressor 24 and the range of increasing the temperature of the exhaust air Ae [$\Delta T$=(temperature at the discharge side)−(temperature at intake side)], i.e., temperature increasing characteristics. As seen from this figure, it can be understood that when the pressure ratio is increased (or decreased), the range of increasing the temperature is increased (or decreased). Consequently, by controlling the pressure control valve 25, the temperature of the exhaust air Ae at the discharge side of the compressor 24 can be controlled and, thus, the supply air A, which will be heat-exchanged, can be controlled.

(3) With regard to the humidity control, the controller 4 controls the humidity of the supply air A to be supplied into the inlet of the fuel cell 1 at the cathode pole side so as to be a target humidity on the basis of the detected signal from the humidity sensor H by controlling the opening of the needle valve of the humidifier 23 through a stepping motor. Specifically, when the humidity of the supply air is or will be increased to be higher than the target humidity, the controller 4 produces a control signal such as to drive the stepping motor in such a manner as to decrease the opening of the needle valve and send the produced control signal. This decreases the amount of moisture flowing through the needle valve, decreasing the humidify of the supply air A. On the other hand, when the humidity of the supply air is or will be decreased to be higher than the target humidity, the controller 4 produces a control signal such as to drive the stepping motor in such a manner as to increase the opening of the needle valve and send the produced control signal. This increases the amount of moisture flowing through the needle valve, increasing the humidify of the supply air A. At this time, a feedback control is performed so that the deviation between the detected signal from the humidity sensor H and the target humidity becomes zero.

Next, one example of the operation of the gas-supplying apparatus GS1 in the fuel cell according to the first embodiment, which has been described, will now be described by referring to FIG. 4 (also referring to FIGS. 1 to 3 as occasion may demand).

Figure 4:
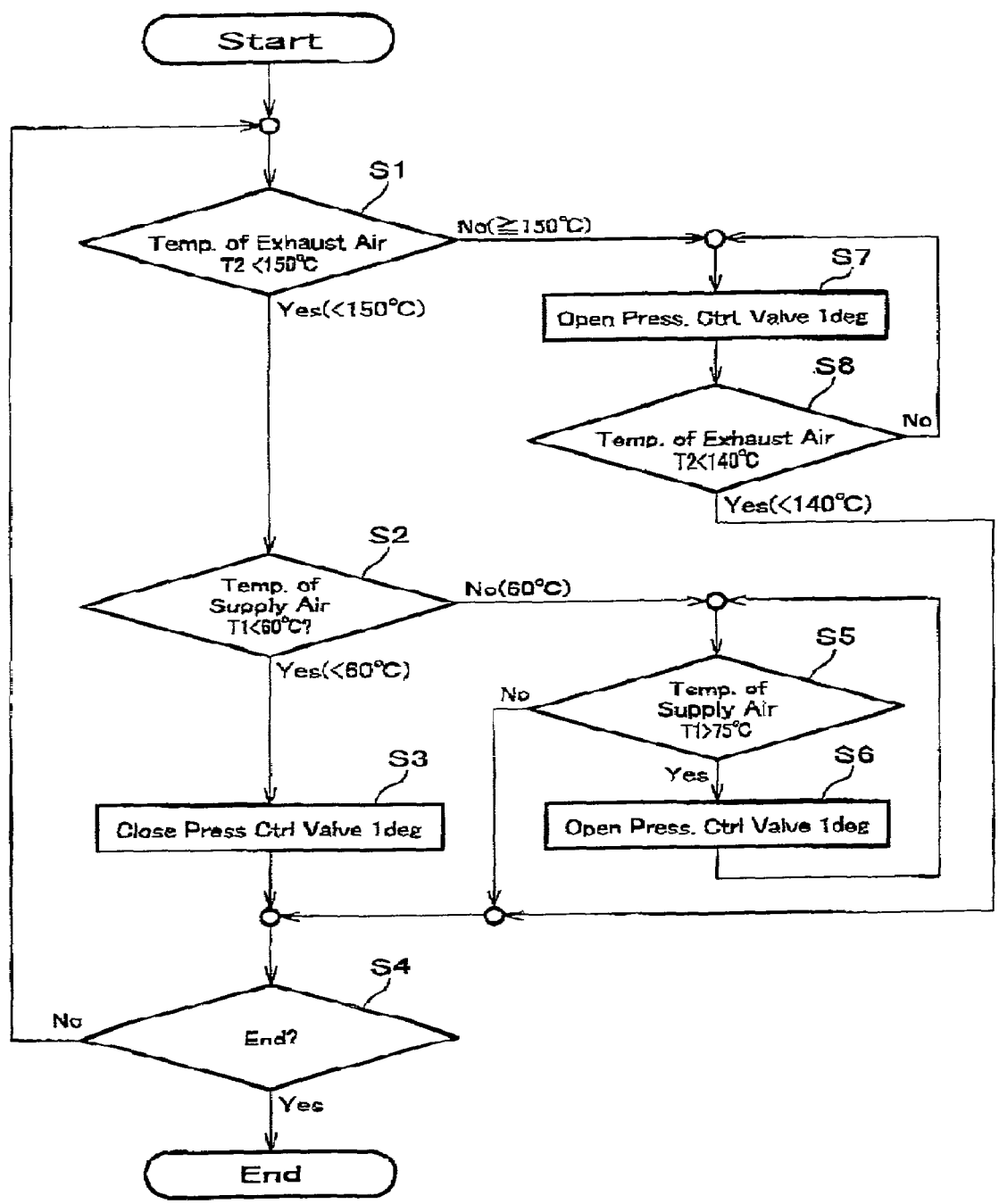
FIG. 4 shows a control flow of a gas-supplying apparatus in the fuel cell according to the first embodiment of the present invention.

FIG. 4 shows a control flow of a gas-supplying apparatus in the fuel cell. In this control flow and the description thereof, the symbol $T_1$ indicates the temperature detected by the thermo-sensor $T_1$, and the symbol $T_2$ indicates the temperature detected by the thermo-sensor $T_2$.

Usual Treatment: In Step S1, the controller 4 judges the temperature $T_2$ of the exhaust air Ae at the discharge side of the compressor 24. If the temperature $T_2$ is lower than 150° C., the controller 4 judges the temperature $T_1$ of the supply air A at the inlet of the fuel cell 1 of the cathode pole side in Step S2. If the temperature $T_1$ is lower than 60° C., which is too low, the controller 4 closes the pressure control valve 25 one degree (S3). This increases the temperature $T_2$ of the exhaust air Ae at the discharge side of the compressor 24 and, at the same time, increases the temperature $T_1$ of the supply air A whose temperature is heat-exchanged with that of the exhaust air is also increased (with regard to the flow amount of the supply air A, it is controlled so as to be the target flow amount irrelevant to the opening of the pressure control valve [and so forth]). Even if the temperature $T_1$ of the supply air A is still lower than 60° C. when being returned to step S2 via step S4 and step S1, the pressure control valve 25 is closed 1 degree in step S3. This further increases the temperature $T_1$ of the supply air A.

When the temperature $T_1$ of the supply air A is not lower than 60° C. the above-mentioned step S2, the controller 4 judges whether or not the temperature $T_1$ of the supply air A is equal to or higher than 75° C. in step S5. If the temperature $T_1$ is higher than 75° C., which is too high, the pressure control valve 25 is opened 1 degree (S6). This decreases the temperature $T_2$ of the exhaust air Ae at the discharge side of the compressor 24 and, at the same time, decreases the temperature $T_1$ of the supply air A which is heat-exchanged with the exhaust air Ae. If the temperature $T_1$ of the supply air A is still higher than 75° C. when being returned to step S5, the pressure control valve 25 is further opened another 1 degree, which further decreases the temperature $T_1$ of the supply air A.

In another embodiment, it is possible that if the temperature of supply gas is higher than that of the demand temperature, the flow amount of the exhaust gas introduced into the heat exchanger is decreased by a bypass means (not shown), in which the exhaust gas bypasses the heat exchanger, which will decrease the temperature of the supply gas. Specifically, it is also the scope of the present invention that the temperature of the exhaust gas is controlled by adjusting the flow amount of the exhaust gas to be introduced into the heat exchanger.

If the temperature $T_1$ of the supply air A at the inlet of the fuel cell 1 of the cathode pole side is lower than 75° C. in step 5, the controller 4 is returned to the position between step S3 and step S4 of the main routine. At the normal situation, these treatments are repeated. It is noted that the term "end of treatment" in step 4 indicates, for example, the situation where the operation of the fuel cell system FCS is stopped.

Treatment at High Temperature: If the temperature $T_2$ of the exhaust air Ae at the discharge side of the compressor 24 is not lower than 150° C., the controller 4 opens the pressure control valve 25 1 degree at step S7 in order to protect the compressor 24 etc. This decreases the pressure and the temperature $T_2$ of the exhaust air Ae at the discharge side of the compressor 24. If the temperature $T_2$ of the exhaust air Ae at the discharge side of the compressor 24 is not lower than 140° C. in step S8, the controller 4 is returned to step 7 to further open the pressure control valve 25 another 1 degree. This further decreases the temperature $T_2$ of the exhaust air Ae. When the temperature $T_2$ of the exhaust air Ae at the discharge side of the compressor 24 becomes lower than 140° C. in step S8, which is sufficiently lowered, the controller 4 is returned to the position between step S3 and step S4 of the main routine. The reason why the treatment at a high temperature up to 140° C. is that the temperature $T_2$ of the exhaust air Ae exceeding 150° C. should be sufficiently cooled down to protect the compressor 24, etc. Also, such a treatment is carried out to prevent from being frequently shifted to the treatment at a high temperature from the viewpoint of the control.

As described above, according to the gas-supplying apparatus GS in the fuel cell according to the first embodiment, the temperature control of the supply air A can be surely carried out through a very simple configuration that the pressure control valve 25 is provided and it is opened or closed. Also, according to this embodiment, heat can be effectively utilized. Furthermore, the heat exchanger 22 may always transmit the heat possessed by the exhaust air Ae to the supply air A to heat the supply air A, the simple configuration can be designed. It is noted that when the humidity is decreased in each of the above-mentioned steps, the controller 4 may increase the amount of moisture to be injected to carry out humidification. Also, if the target flow amount is increased (or decreased), the controller 4 may increase (or decrease) the revolution number of the motor to be normalized. It is also noted that in the hydrogen-supplying apparatus, the temperature control and the humidity control are carried out.

Second Embodiment

Next, a gas-supplying apparatus in the fuel cell according to the second embodiment of the present invention will now be described. Elements, parts, and the like identified with those of the first embodiment have the same numerals or symbols and their descriptions will be omitted.

Figure 5:
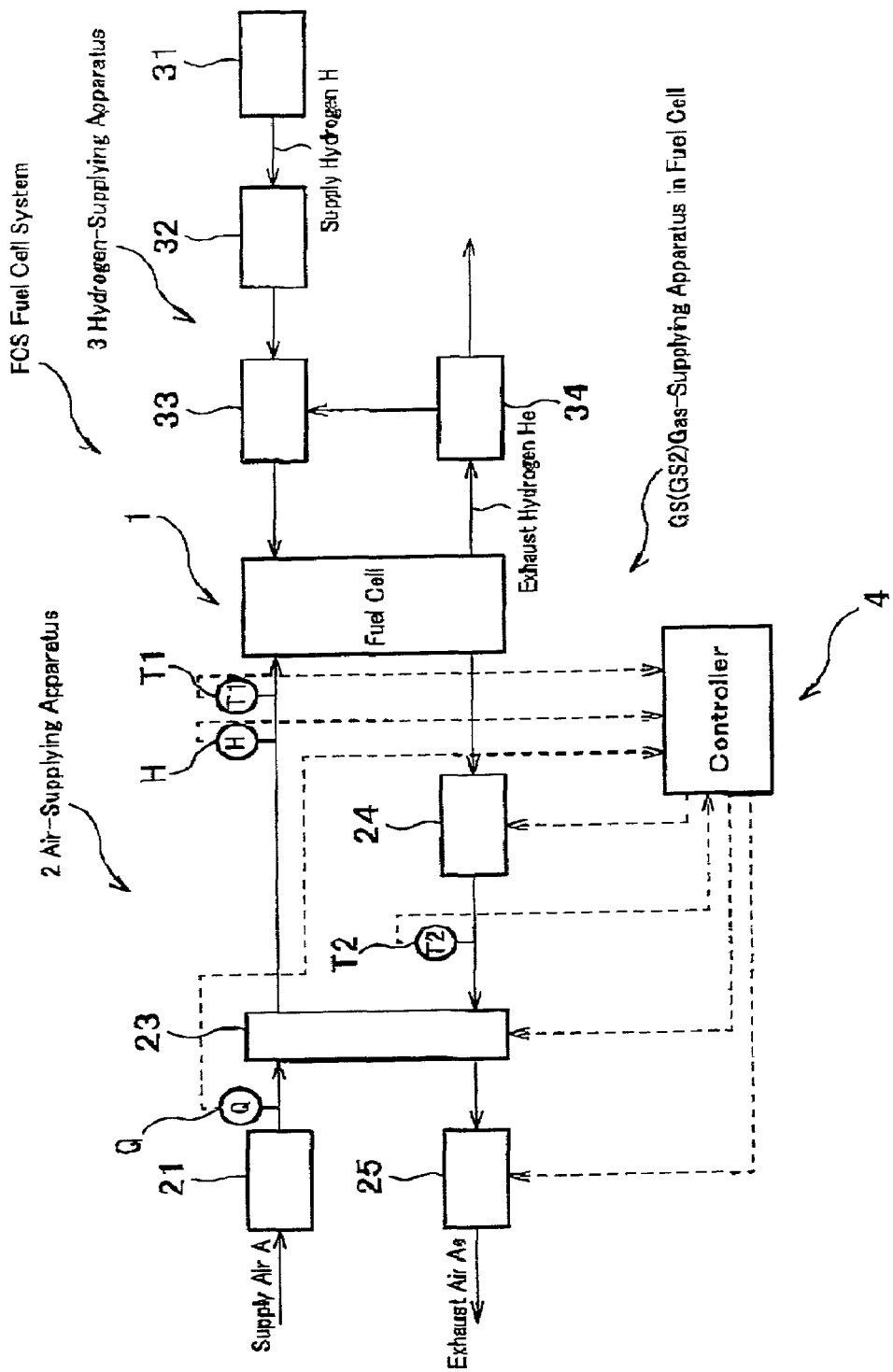
FIG. 5 shows a control flow of a gas-supplying apparatus in the fuel cell according to the second embodiment of the present invention.

FIG. 5 shows a control flow of a gas-supplying apparatus in the fuel cell according to the second embodiment of the present invention.

In a gas-supplying apparatus GS2 in the fuel cell according to the second embodiment, a water-permeable type humidifier utilizing hollow fiber membrane (not shown) is used as the humidifier 23. The hollow fiber membrane comprises hollow fibers each having a hollow passage, a diameter ranging from 1 to 2 mm and a length of several ten cm. The humidifier 23 is composed of two hollow fiber membrane modules each accommodated within a hollow container, each module comprising a bundle of several thousands of hollow fibers, piping which connects these two hollow fiber membrane modules in parallel, switchers (switching means) for switching these two hollow fiber membrane modules depending upon the flow amount and the humidity of the supply air, such as an electromagnetic valve and a controller for the electromagnetic valve (all being not shown). In this embodiment, the controller for the electromagnetic valve is included in the controller 4.

A packing ratio of the hollow fiber membrane in each hollow fiber membrane module is from 40 to 60% relative to the cross-section of the hollow container. The hollow fiber membrane module is configured so that the exhaust air Ae flows from one end of the hollow passage and is discharged from another end. Also, the hollow fiber membrane module is configured so that the supply air A flows through the gaps among the hollow fibers and is then discharged. Specifically, the hollow fiber membrane module is configured not so as to mix the supply air A with the exhaust air Ae. On the other hand, the hollow fiber membrane module possesses a plurality of capillary tubes from its internal surface to the external surface each having a diameter of several nm. In the capillary tubes, the vapor pressure is decreased, easily resulting in condensation of the moisture. The condensed moisture is sucked out due to the capillary phenomenon and is permeated through the hollow fiber membrane. Consequently, when the exhaust air Ae containing a large amount of moisture produced in the fuel cell 1 flows through the hollow passage, the moisture is condensed on the internal surface of the hollow passage, and the condensed moisture humidifies the supply air A which is relatively dried and flows through the gaps among the hollow fibers. It is also possible that the supply air A flows through the hollow passage side and the exhaust air Ae flows through the gaps among the hollow fibers.

The humidifier 23 is configured so that when the flow amount of the supply air is small, the switcher switches the hollow fiber membrane modules so as to only use one hollow fiber membrane module, and when the flow amount of the supply air is large, the switcher switches the hollow fiber membrane modules so as to use both hollow fiber membrane modules. The switching of the hollow fiber membrane module is due to the humidification characteristic of the hollow fiber membrane module that the humidification performance of the hollow fiber membrane module is decreased if the follow amount of the supply air A and that of the exhaust air Ae are too small or too large. The timing for switching the hollow fiber membrane modules or such is decided by the detected signal from the airmometer Q and the detected signal from the humidity sensor H.

The humidifier 23 utilizing the hollow fiber membrane modules also serves as a heat exchanger which exchanges the heat possessed by the supply air A and that possessed by the exhaust air Ae. Consequently, unlike the first embodiment, the gas-supplying apparatus according to this embodiment has no separate heat exchanger.

The gas-supplying apparatus GS2 according to the second embodiment having the same configurations as those of the first embodiment, except for the portion of the heat exchanger and the humidifier can surely control the temperature of the supply air A only by the simple configuration of opening or closing the pressure control valve 25. Also, with regard to the utilization of heat, the apparatus according to this embodiment has similar characteristic as those of the first embodiment. Furthermore, in the gas-supplying apparatus GS2 according to the second embodiment, which can effectively utilize a large amount of the moisture contained in the exhaust air Ae, the moisture for humidification is not required to be stored, or the amount of the moisture to be stored can be minimized. Also, the humidification of the supply air A can be carried out in a uniform manner.

Third Embodiment

Next, a gas-supplying apparatus in the fuel cell according to the third embodiment of the present invention will now be described. Elements, parts, and the like identified with those of the first embodiment have the same numerals or symbols and their descriptions will be omitted.

Figure 6:
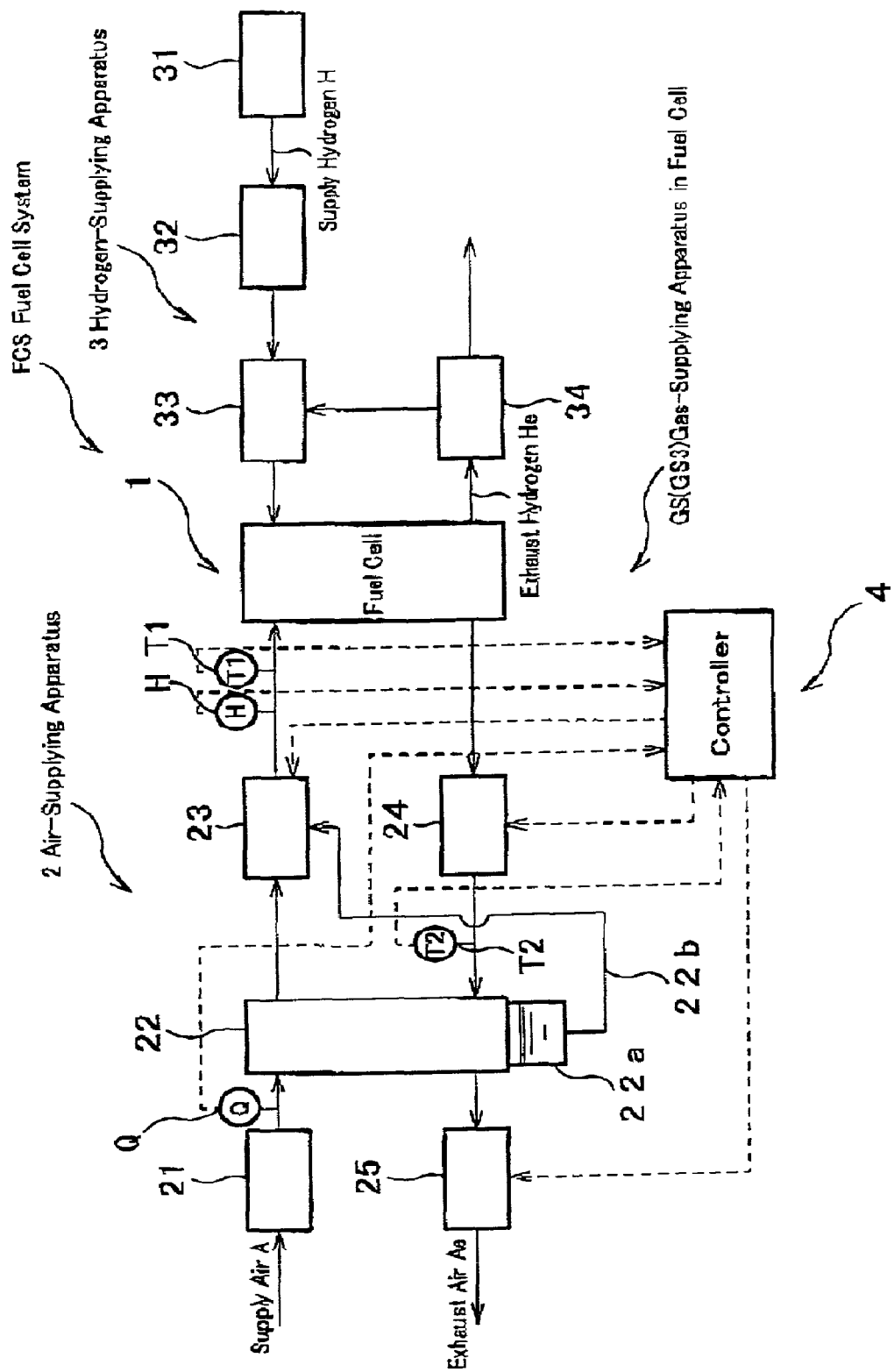
FIG. 6 shows a control flow of a gas-supplying apparatus in the fuel cell according to the third embodiment of the present invention.

FIG. 6 shows a control flow of a gas-supplying apparatus in the fuel cell according to the third embodiment of the present invention.

In a gas-supplying apparatus GS3 in the fuel cell according to the third embodiment, the moisture condensed in the heat exchanger 22 is utilized as the moisture for the humidification in the humidifier 23. Accordingly, the heat exchanger 22 according to the third embodiment has a catch tank 22a which captures the moisture condensed and separated from the exhaust air Ae, and a water feed pipe 23, which supplies the condensed moisture to a water storage tank (not shown). The catch tank 22a may also serve as the water storage tank. It is noted that the heat exchanger which condenses the water is generally utilized in an air conditioner.

The gas-supplying apparatus GS3 according to the third embodiment having the same configurations as those of the first embodiment, except for supplying of the condensed moisture in the heat exchanger 22 to the humidifier 23 can surely control the temperature of the supply air A only by the simple configuration of opening or closing the pressure control valve 25. Also, the gas-supplying apparatus GS3 according to the third embodiment can effectively utilize a large amount of the moisture contained in the exhaust air Ae discharged from the cathode side of the fuel cell 1 as in the second embodiment.

Fourth Embodiment

Next, a gas-supplying apparatus in the fuel cell according to the fourth embodiment of the present invention will now be described. Elements, parts, and the like identified with those of the first to the third embodiments have the same numerals or symbols and their descriptions will be omitted.

Figure 7:
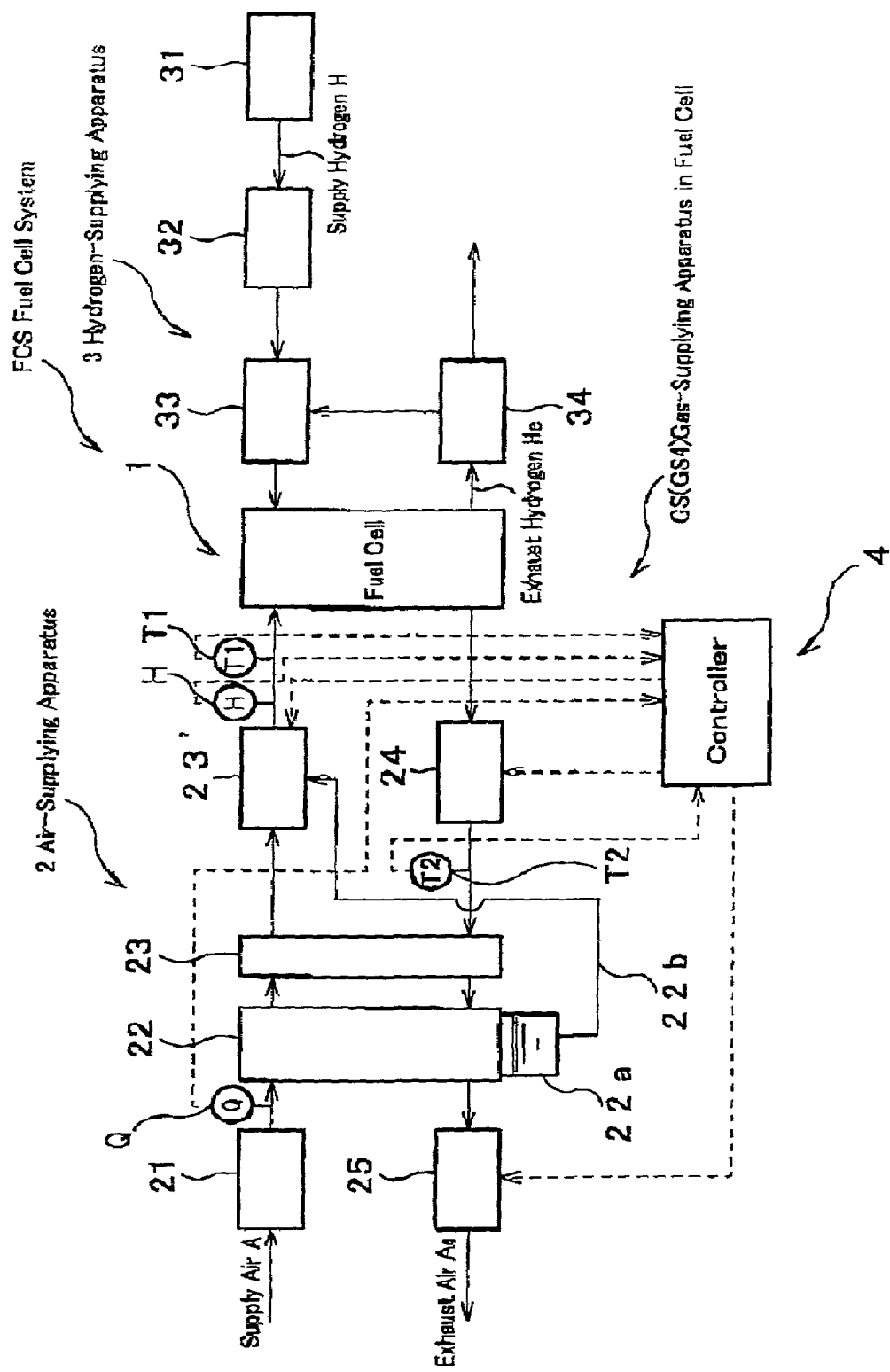
FIG. 7 shows a control flow of a gas-supplying apparatus in the fuel cell according to the fourth embodiment of the present invention.

FIG. 7 shows a control flow of a gas-supplying apparatus in the fuel cell according to the fourth embodiment of the present invention.

A gas-supplying apparatus GS4 in the fuel cell according to the third embodiment possesses the same heat exchanger 22 as in the third embodiment, i.e., the heat exchanger 22 having a catch tank 22a which captures the moisture condensed and separated from the exhaust air Ae. The humidifier 23 used in this embodiment is the same as the humidifier used in the second embodiment. Specifically, the humidifier 23 used in this embodiment switches two hollow fiber membrane modules to be used depending upon the flow amount and the humidity of the supply air A. Furthermore, according to the fourth embodiment of the present invention, the gas-supplying apparatus has an auxiliary humidifier 23'. The auxiliary humidifier 23' used herein is the same as the humidifier in the third embodiment and the condensed moisture is supplied from the catch tank 22a via the water storage tank (not shown). Any other configurations of the gas-supplying apparatus of this embodiments are the same as those of the first embodiment, and a pressure control valve 25 which controls the pressure of the exhaust air Ae discharged from the compressor 24 is provided after the heat exchanger 22.

It is noted that the auxiliary humidifier 23' is used, for example, in the case where the supply air A cannot be sufficiently humidified i.e., the flow amount of the supply air A is sharply increased or the fuel cell system FCS is started.

The gas-supplying apparatus GS4 according to the fourth embodiment can surely control the temperature of the supply air A only by the simple configuration of opening or closing the pressure control valve 25 as in the first embodiment. Also, in the gas-supplying apparatus GS4 according to the fourth embodiment, since the humidifier serves as the heat exchanger in which the heat possessed by the exhaust air Ae is transmitted to the supply air A in addition to the heat exchanger, the gas-supplying apparatus GS4 can effectively utilize the heat possessed by the exhaust air Ae. What is more, the moisture contained in the exhaust air Ae, which has not been used in the humidifier 23, can be recovered in the heat exchanger 22 to be used in the humidifier 23'. Consequently, the gas-supplying apparatus according to this embodiment can effectively utilize the moisture, and can securely humidify the supply air A even when the flow amount of the supply air A is changed.

As described above, according to the present invention, the heat generated from the fuel cell can be effectively utilized and, at the same time, the heat generated during the course of pumping (compressing) the exhaust gas through the compressor can also be effectively utilized in the present invention. Consequently, the heat efficiency can be improved. Furthermore, since the heat exchanger can only heat the supply air always utilizing the exhaust gas as a heat source, the gas-supplying apparatus has a simple configuration and has improved reliability. Moreover, since the compressor for the exhaust gas is provided downstream of the fuel cell, the work power can be decreased in comparison with the case where it is provided upstream the fuel cell. Specifically, the power (electric power consumption) can be decreased in comparison with the compressor provided upstream the fuel cell. Also, the power output from the fuel cell can be effectively utilized without sharing with the compressor for the exhaust gas. When the gas-supplying apparatus is applied to the fuel gas (hydrogen gas) side, the fuel gas side can be operated by a negative pressure. Consequently, the leakage of the fuel gas can be prevented.

While embodiments of the present invention have been described, various modifications of the present invention can be made.

For example, while the hydrogen-supplying apparatus in these embodiments has a configuration that hydrogen is supplied from the hydrogen gas cylinder into the fuel cell, a liquid raw fuel material may be reformed in a reformer, which is supplied into the fuel cell. Regardless of the circulation of the exhaust hydrogen, the present invention may be applied at the side of the hydrogen gas-supplying apparatus. The humidifier may be one which utilize a two fluid nozzle or supersonic waves. The water-permeable membrane is not restricted to the hollow fiber membrane. With regard to the compressor, in addition to a super turbo charger type or a turbo charger type, which revolves a turbine, a reciprocating type may also be utilized. Also, the pressure control valve may be provided between the compressor and the heat exchanger to utilize heat generated due to adiabatic compression heating of the compressor. It is needless to say that these modified configurations are within the scope of the present invention.

Furthermore, while the gas-supplying apparatus in the fuel cell has been described herein, a gas-supplying mechanism which heat-exchanges the heat of the supply gas to be supplied into the fuel cell and the heat of the exhaust gas discharged after being utilized in the power generation in the fuel cell and which transmits the heat of the exhaust gas to the supply gas also falls within the scope of the present invention.

What is claimed is:

1. A gas supplying apparatus in a fuel cell, wherein the fuel cell is supplied a supply gas and discharges the supply gas as exhaust gas, the gas supplying apparatus comprising:
   a compressor which sucks the exhaust gas from downstream of said fuel cell, and which compresses the exhaust gas, which is generated from said supply gas by power generation in the fuel cell, and
   a heat exchanger, into which the supply gas having a pressure lower than atmospheric pressure and the exhaust gas having a pressure higher than said supply gas are introduced to perform heat exchange between said supply gas and said exhaust gas, wherein said compressor increases the temperature of the exhaust gas by compressing the exhaust gas before the exhaust gas is introduced to said heat exchanger.

2. The gas-supplying apparatus in a fuel cell as claimed in claim 1, further possessing a controller, which controls the pressure of the exhaust gas to be incorporated into the heat exchanger.

3. The gas-supplying apparatus in a fuel cell as claimed in claim 2, wherein the pressure of the exhaust gas is controlled depending upon the temperature of the supply gas.

4. The gas-supplying apparatus in a fuel cell as claimed in claim 3, wherein the pressure of the exhaust gas is controlled in such a manner that the temperature of the supply gas becomes a demand temperature.

5. The gas-supplying apparatus in a fuel cell as claimed in claim 4, wherein the pressure of the exhaust gas to be introduced into the heat exchanger is controlled through the controller so as to be increased when the temperature of the supply gas is lower than the demand temperature.

6. The gas-supplying apparatus in a fuel cell as claimed in claim 4, wherein said exhaust gas to be introduced into the heat exchanger is controlled through the controller so as to be decreased when the temperature of the supply gas is higher than the demand temperature.

7. The gas-supplying apparatus in a fuel cell as claimed in claim 2, wherein said controller is a control valve, which controls the pressure of the exhaust gas to be incorporated into the heat exchanger.

8. The gas-supplying apparatus in a fuel cell as claimed in claim 1, wherein said heat exchanger comprises a water-permeable membrane type humidifier which humidifies the supply gas with the water contained in the exhaust gas.

9. The gas-supplying apparatus in a fuel cell as claimed in claim 8, further possessing a controller, which controls the pressure of the exhaust gas to be incorporated into the heat exchanger.

10. A process for controlling a temperature of a supply gas to be supplied to a fuel cell, comprising:
    introducing said supply gas having a pressure lower than atmospheric pressure into a heat exchanger and, at the same time, introducing an exhaust gas discharged from the fuel cell and having a pressure higher than said supply gas to perform heat exchange between the supply gas and the exhaust gas, wherein the temperature of said exhaust gas is increased by compressing the exhaust gas before the exhaust gas is introduced into said heat exchanger.

11. A process for controlling a temperature of a supply gas to be supplied to a fuel cell, comprising:
  compressing an exhaust gas discharged from the fuel cell to increase the temperature of the exhaust gas;
  introducing said supply gas having a pressure lower than atmospheric pressure into a heat exchanger, and
  introducing the compressed exhaust gas having a pressure higher than said supply gas into said heat exchanger to perform heat exchange between the supply gas and the compressed exhaust gas.

12. A process for controlling a temperature of a supply gas to be supplied to a fuel cell, comprising:
  introducing said supply gas having a pressure lower than atmospheric pressure into a heat exchanger, and
  introducing the exhaust gas having a pressure higher than said supply gas into said heat exchanger to perform heat exchange between the supply gas and the exhaust gas, wherein the temperature of the exhaust gas is increased prior to introducing the exhaust gas into the heat exchanger.

13. A gas supplying apparatus in a fuel cell, wherein the fuel cell receives a supply gas and discharges an exhaust gas, the gas supplying apparatus comprising:
  a heat exchanger for receiving the supply gas having a pressure lower than atmospheric pressure and for receiving the exhaust gas having a pressure higher than the supply gas, wherein the exhaust gas exchanges heat with the supply gas in said heat exchanger,
  a compressor positioned between the fuel cell and the heat exchanger for compressing the exhaust gas to control the temperature of the exhaust gas before the exhaust gas is introduced to said heat exchanger.

* * * * *